(12) United States Patent
Branca et al.

(10) Patent No.: US 8,316,115 B2
(45) Date of Patent: *Nov. 20, 2012

(54) SHARING PERFORMANCE DATA BETWEEN DIFFERENT INFORMATION TECHNOLOGY PRODUCT/SOLUTION DEPLOYMENTS

(75) Inventors: Salvatore Branca, Rome (IT); Paolo Cavazza, Rome (IT); Scot MacLellan, Rome (IT)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/273,793

(22) Filed: Oct. 14, 2011

(65) Prior Publication Data

US 2012/0079083 A1   Mar. 29, 2012

Related U.S. Application Data

(63) Continuation of application No. 12/207,318, filed on Sep. 9, 2008, now Pat. No. 8,055,739.

(51) Int. Cl.
*G06F 15/177* (2006.01)
(52) U.S. Cl. ......... 709/220; 709/221; 709/224; 713/100
(58) Field of Classification Search .................. 709/220, 709/221, 224; 713/100
See application file for complete search history.

(56) References Cited

U.S. PATENT DOCUMENTS

| | | | |
|---|---|---|---|
| 6,421,719 B1* | 7/2002 | Lewis et al. | 709/224 |
| 6,944,759 B1 | 9/2005 | Crisan | |
| 6,976,063 B1 | 12/2005 | Dharmarajan et al. | |
| 7,328,261 B2* | 2/2008 | Husain et al. | 709/224 |
| 7,509,324 B2* | 3/2009 | Burr et al. | 1/1 |
| 2003/0126260 A1 | 7/2003 | Husain et al. | |
| 2003/0200098 A1 | 10/2003 | Geipel et al. | |
| 2004/0177245 A1* | 9/2004 | Murphy | 713/100 |
| 2006/0053114 A1 | 3/2006 | Burr et al. | |
| 2007/0180433 A1 | 8/2007 | Ghobrial et al. | |
| 2007/0234346 A1 | 10/2007 | Kramer et al. | |
| 2010/0064035 A1 | 3/2010 | Branca et al. | |
| 2010/0234097 A1 | 9/2010 | Gelber et al. | |

FOREIGN PATENT DOCUMENTS

| | | | |
|---|---|---|---|
| EP | 1096406 A2 | | 5/2001 |
| EP | 1096406 A2 * | | 5/2001 |
| EP | 1096406 A3 | | 5/2003 |

OTHER PUBLICATIONS

USPTO U.S. Appl. No. 12/207,318.

* cited by examiner

*Primary Examiner* — Ario Etienne
*Assistant Examiner* — Michael C Lai
(74) *Attorney, Agent, or Firm* — Stephen J. Walder, Jr.; Jeffrey S. LaBaw

(57) ABSTRACT

A method and system for dynamically sharing performance information among multiple computing nodes. One implementation involves dynamically obtaining performance information from deployments of an information technology (IT) product/solution at said computing nodes, and transmitting the obtained performance information to a server over a communication network for storing the obtained performance information in a knowledge database. The server operates to dynamically determine new configuration information based on the information in the database, store the new configuration in the database, and provide the new configuration information to said deployments by transmitting the new configuration information over the network.

14 Claims, 7 Drawing Sheets

SHARING PERFORMANCE DATA BETWEEN DIFFERENT INFORMATION TECHNOLOGY PRODUCT/SOLUTION DEPLOYMENTS

CROSS REFERENCE TO RELATED APPLICATIONS

This application is a continuation of application Ser. No. 12/207,318, filed Sep. 9, 2008, now U.S. Pat. No. 8,055,739.

BACKGROUND OF THE INVENTION

1. Field of the invention

The present invention relates generally to configuring information technology (IT) products/solutions and in particular to sharing configuration information between IT product/solution deployments.

2. Background Information

When deploying an infoiination technology (IT) product/solution in a production environment, a frequent and difficult to solve problem is finding the optimal set of configurations to achieve a particular service level or performance target. An issue in deploying enterprise applications today, and determining the configuration that delivers optimal performance, is that applications are increasingly based on a set of other software products which provide a runtime platform for the application (middleware). Another issue is that the applications are developed to run on many platforms (operating systems). Yet another issue is that each application has to be specifically tuned since best practices for development and delivery of optimal performance are not always followed.

Currently if the same IT product/solution is deployed on different customer environments, each customer has to spend time to find the optimal configuration. If two customers have similar computing environments, which leads them to the same optimal configuration, each customer still has to spend time finding an optimal configuration since these customers do not have a dynamic mechanism for sharing information about the optimal configuration. Similar issues arise when an IT service provider has to configure the product/solution multiple times.

SUMMARY OF THE INVENTION

The invention provides a method and system for sharing performance data between different information technology product/solution deployments, according to an embodiment of the invention. One implementation involves a method and system for dynamically sharing performance infoimation among multiple computing nodes comprising dynamically obtaining performance information from deployments of an information technology (IT) product/solution at said computing nodes, and transmitting the obtained performance information to a server over a communication network for storing the obtained performance information in a knowledge database. The server operates to dynamically determine new configuration information based on the information in the database, store the new configuration in the database, and provide the new configuration information to said deployments by transmitting the new configuration information over the network.

The performance information at each deployment may include current configuration information at that deployment and determining new configuration information may further include determining new configuration information based on the configuration information in the database.

The performance information may include current configuration parameter information for hardware and software configuration at each deployment based on configuration policies of the deployment, and determining new configuration information may further include determining optimal configuration based on the information in the database.

Determining optimal configuration information for a deployment may further include, based on the information obtained from that deployment, assigning a deployment type to the deployment based on the obtained parameter information from the deployment, wherein the deployment type is a function of the characteristics of the computing environment of the deployment, and if an optimal configuration exists in the database for that deployment type, then providing the existing optimal configuration for that deployment type. If an optimal configuration does not exist in the database for that deployment type, then: determining an optimal configuration for the deployment based on the configuration information in the database for that deployment type, storing the optimal configuration for the deployment in the database, and providing the optimal configuration for the deployment.

The new configuration information may be applied at a deployment based on configuration policies at the deployment. A deployment may request new configuration information, such that providing new configuration information may include providing the new configuration information to the requesting deployment.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which.

DESCRIPTION OF THE PREFERRED EMBODIMENTS

Figure 1:
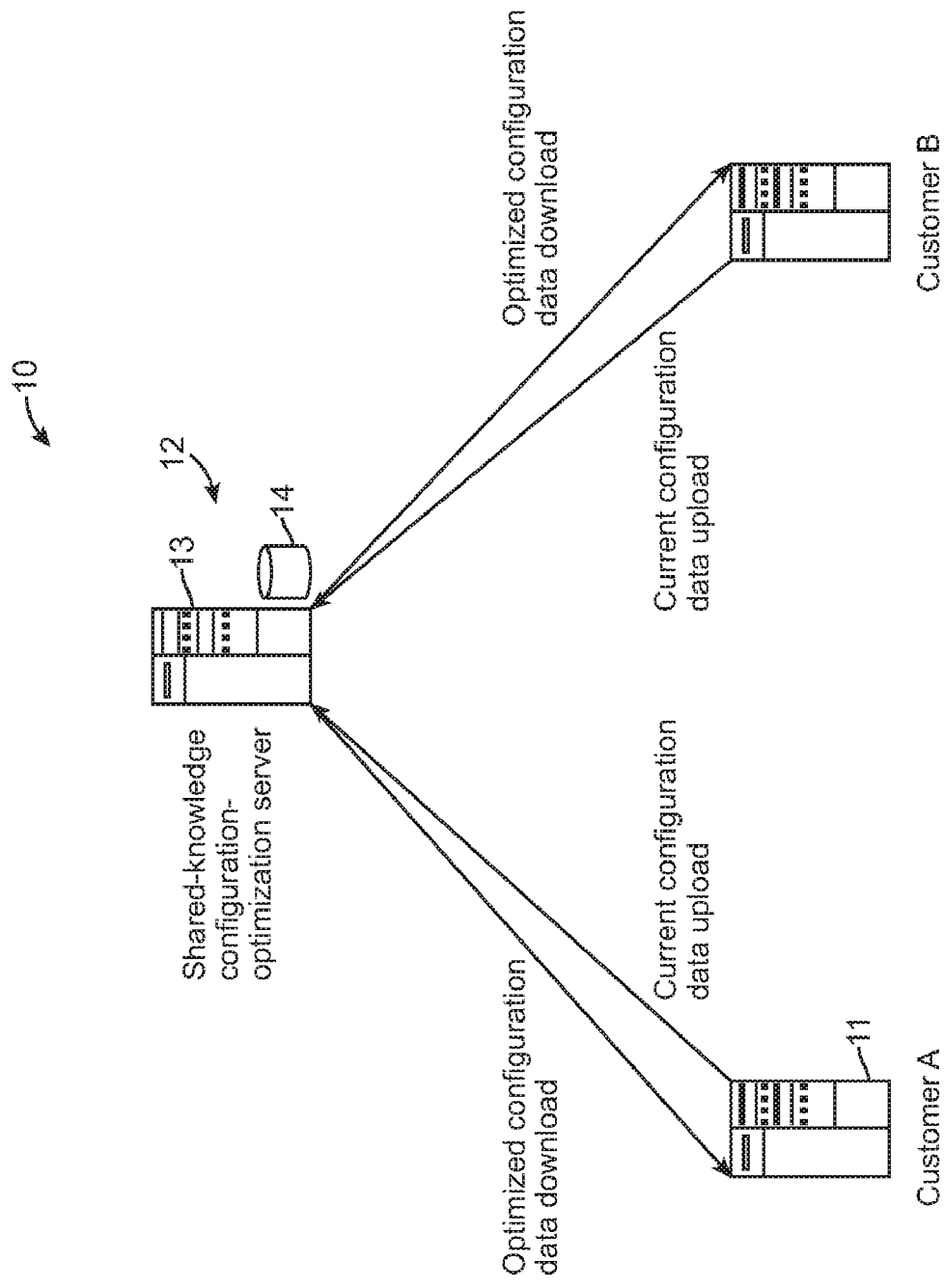
FIG. 1 shows a functional block diagram of a knowledge-sharing system for sharing performance data between different information technology product/solution deployments, according to an embodiment of the invention.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The invention provides a method and system for dynamically sharing performance data, such as configuration information, between different information technology (IT) product/solution deployments. One embodiment involves a knowledge-sharing mechanism that allows sharing configuration information by dynamically obtaining and storing information in a database, said infon ation including information about new configuration for deployments of a (IT) product/solution (e.g., software product) in various computing environments, and providing such new configuration information for an environment from the database to a client of the environment.

In one embodiment, the new configuration information includes essentially optimal configuration infoimation. The knowledge-sharing mechanism applies to multiple deployments of an IT product/solution, to reduce the timeframe for finding an optimal configuration at such multiple deployments, thereby avoiding duplication of effort for the same task in multiple deployments. The invention further provides dynamically improving the performance model of the IT product/solution, thus overcoming the limitations of using static local configuration advisors.

One implementation involves a knowledge-sharing mechanism that enables a Web2.0-like system to deliver value at enterprise level and between enterprises (Enterprise 2.0). This provides a knowledge-sharing system between multiple deployments of a given IT product/solution to find the optimal performance configuration for that IT product/solution. Such a system generally comprises a client for each IT product/solution deployment, and a server. A client is configured for optimizing the corresponding IT product/solution deployment by collecting required hardware and software data from that deployment, sending that data to the server, and receiving a configuration that is optimal for that deployment. The server is configured for collecting data from all deployments of an IT product/solution, finding the best (optimal) configuration for each deployment, and sending the optimal configuration information back to each deployment.

In one operation scenario, a client comprises a software module embedded in a particular IT product/solution, periodically sending configuration status of the IT product/solution deployment in a computing environment to the server, together with the optimization policies to be applied to that deployment. The server analyzes such information to determine if the configuration is optimal for that environment according to a desired customer optimization policy. The server determines if the configuration is optimal by leveraging already known configurations for similar computing environment(s) and similar optimization policies from other deployments (customers), and/or analytical configuration optimization techniques.

Once the server determines the optimal configuration for the IT product/solution deployment in a computing environment, the server sends the optimal configuration information to the client for that deployment. The customer of the deployment can then decide to let the system automatically implement configuration changes to the current configuration to move to the optimal configuration status, or require a manual confirmation to validate the changes before processing them.

As the number of deployments of the IT product/solution increases, so does the optimality of the configuration for similar computing environments. This further allows dynamic enhancement of a performance model of the IT product/solution. If different configurations are needed at different times (e.g., seasonal variations of the computing load), the system provides different configurations that can be promptly requested to be downloaded to each deployment from the server. The system provides a knowledge-creating mechanism by generating optimal configurations for deployments based on collecting information about a variety of configurations (positive and negative), thereby leveraging not only "negative" knowledge (that is knowledge generated when something goes wrong with the IT product/solution) but also "positive" knowledge (that is knowledge of a good behavior of the IT product/solution).

FIG. 1 shows a functional block diagram of a system 10 for sharing performance data between different IT product/solution deployments (e.g., deployment at Customer A and Customer B computing environments), according to an embodiment of the invention. A client module 11 is provided at each IT product/solution deployment at a computing environment to be optimized, and a server 12 leverages the knowledge-sharing of different deployments for generating optimal configurations. The client module 11 and the server 12 are connected via a communication network such as the Internet (other communication networks may be utilized). Each computing environment may include one or more computing nodes, wherein each computing node may include one or more processors, storage devices, database modules, communication modules, networks, etc.

Figure 2:
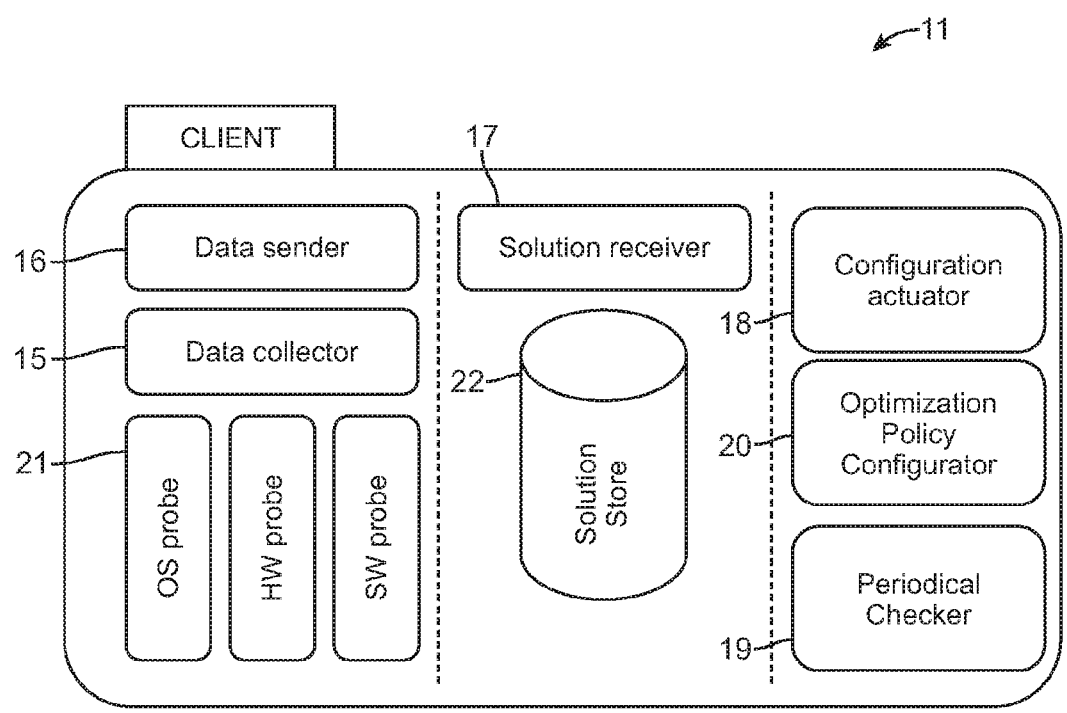
FIG. 2 shows a functional block diagram of a client module in the knowledge-sharing system, according to an embodiment of the invention.

FIG. 2 shows a functional block diagram of an embodiment of a client module 11, including a data collector 15, a data sender 16, a solution receiver 17, a configuration actuator 18, a periodical checker 19, and an optimization policy configurator 20. The data collector 15 gathers the data needed for a performance model, using probes 21. In one example the probes 21 include an OS probe, a HW probe and a SW probe, comprising software modules that interface the OS, the hardware, the middleware at the deployment computing environment, respectively, to extract the needed data for optimal configuration and performance model.

The data sender 16 sends the performance model data to the server 12 (FIG. 1). The solution receiver 17 receives an optimal set of configurations (i.e., the "solution") from the server and stores them in storage 22. The configuration actuator 18 executes the configuration changes required at the IT product/solution deployment. The periodical checker 19 monitors a set of parameters at the deployment for the performance model and initiates data flow (i.e., sending performance model data to the server and receiving an optimal set of configurations) when the values for one or more of said parameters change above/below certain thresholds. The optimization policy configurator 20 allows customers to specify the optimization policies to be applied.

Figure 3:
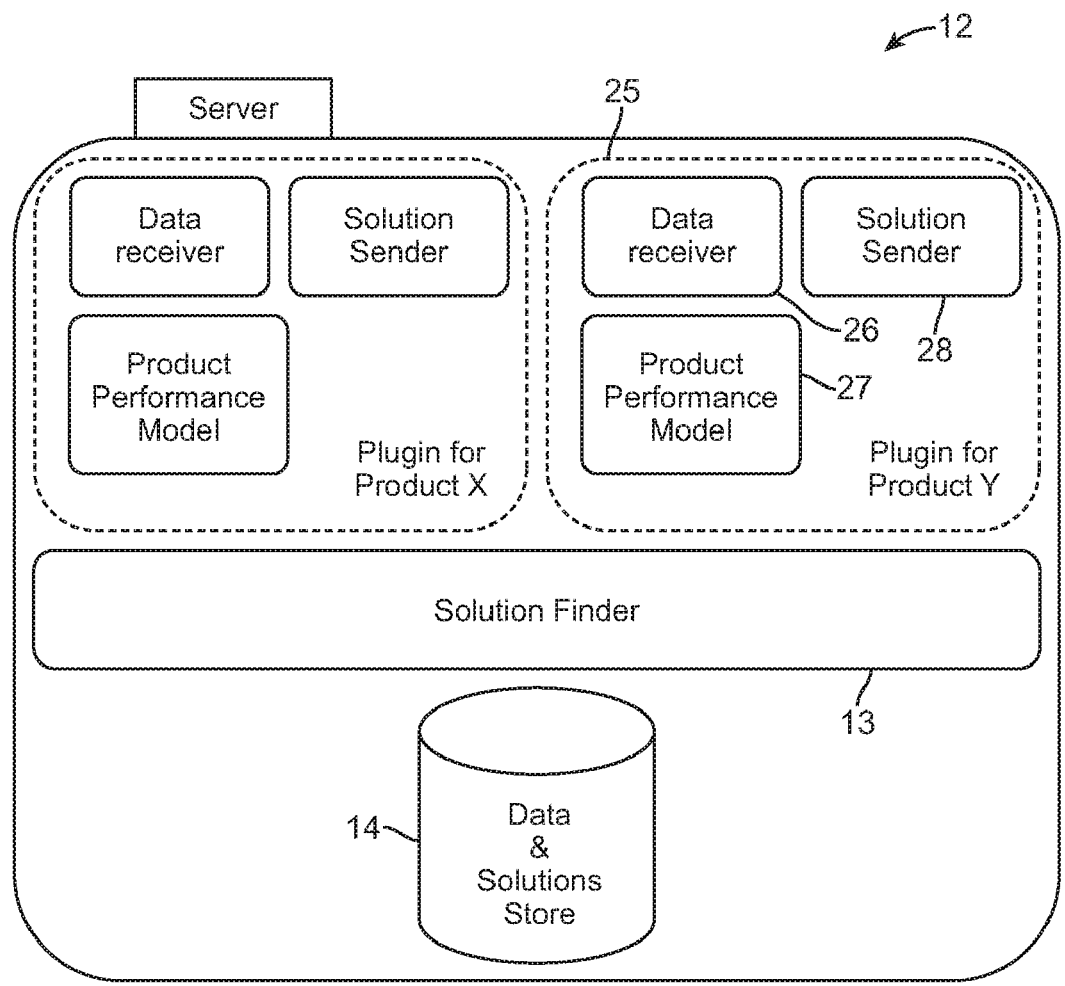
FIG. 3 shows a functional block diagram of a server module in the knowledge-sharing system, according to an embodiment of the invention.

FIG. 3 shows a functional block diagram of an embodiment of the server 12. The server 12 utilizes a product independent infrastructure that provides a plug-in 25 for each IT product/solution. The plug-in 25 allows receiving from each client 11 for a IT product/solution deployment, performance model data comprising a set of performance data needed to describe a configuration of the IT product/solution, and sending to each client a set of data needed to optimize the corresponding deployment. The server 12 includes an optimizing engine (solution finder) 13 configured for operating a performance model that provides essentially best configuration for each IT product/solution deployment based on the data present in a knowledge database 14. The optimizing engine 13 may utilize linear interpolation algorithms or genetic algorithms (or any other optimization technique) to provide the optimal configuration for each deployment.

A plug-in 25 for an IT product/solution (e.g., software product X, software product Y), may communicate with clients 11 at the deployments of that IT product/solution. In one embodiment, a plug-in 25 for an IT product/solution comprises a software module including a data receiver 26, a product performance model 27, and a solution sender 28. The data receiver 26 receives data sent by the clients 11 for deployments of the corresponding IT product/solution. The product performance model 27 represents the performance model of the IT product/solution. In one example, a set of performance parameters to be analyzed is a vector $\underline{A}$={HW data, SW data, deployment dimensions}, a set of parameters to be optimized is a vector P, a set of optimization policies to be applied for each element $\overline{P}_i$ of the vector P can be specified by the customer as a desired variation of the current value of the element $P_i$, a configuration at state i is a union as $d_i = \underline{A} \cup P$, wherein the performance model is represented as a function of the configuration state by $\phi(d_i)$.

Figure 4:
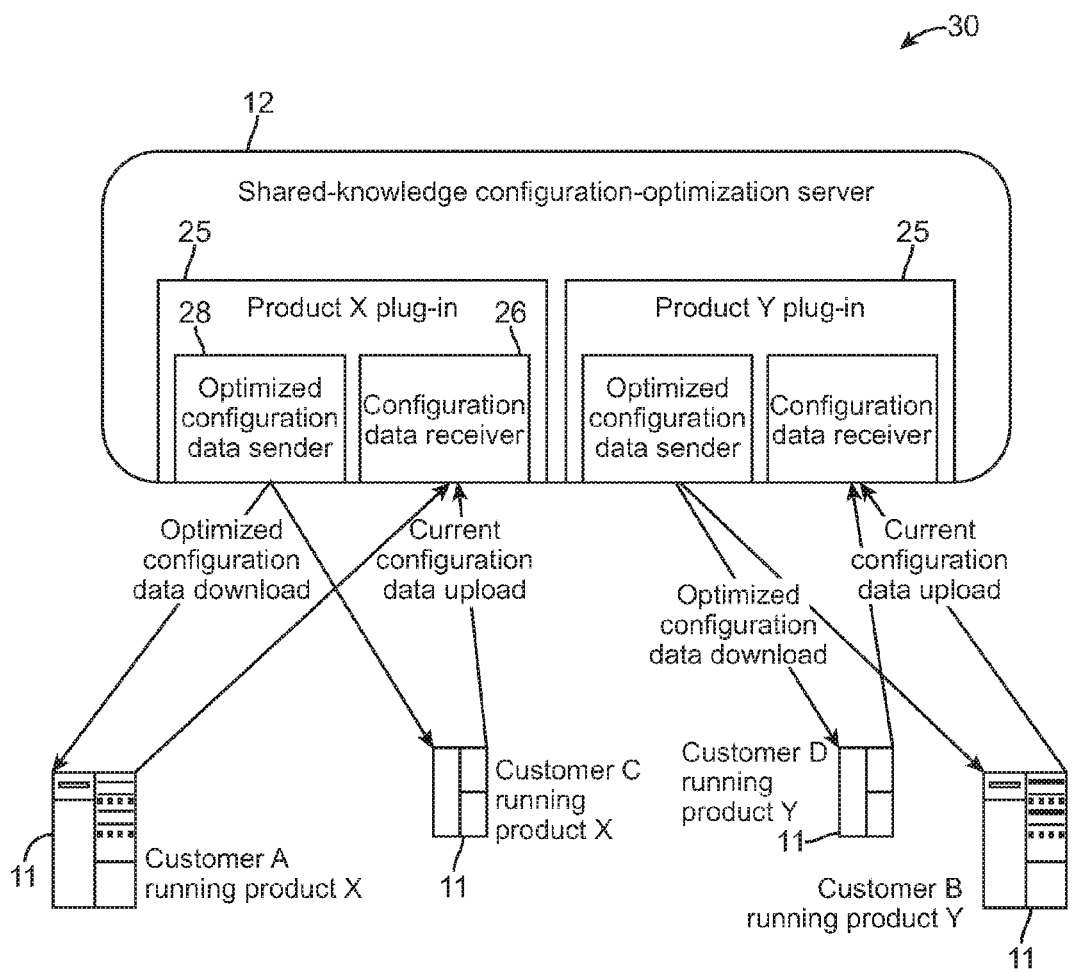
FIG. 4 shows a functional block diagram of an architecture for sharing performance data between different information technology product/solution deployments, according to an embodiment of the invention.

The optimizing engine 13 determines an optimal configuration for the given performance model of an IT product/solution by accessing the data shared between different deployments (different customers) of the IT product/solution. The optimizing engine 13 provides the clients 11 for each IT product/solution (software product X, solution product Y) with the corresponding optimal configuration. As shown by the example architecture 30 in FIG. 4, the server 12 may thus perform the optimal configuration analysis for multiple IT products/solutions via corresponding plug-ins 25 for associated clients 11 at multiple deployments of each IT product/solution.

Figure 5:
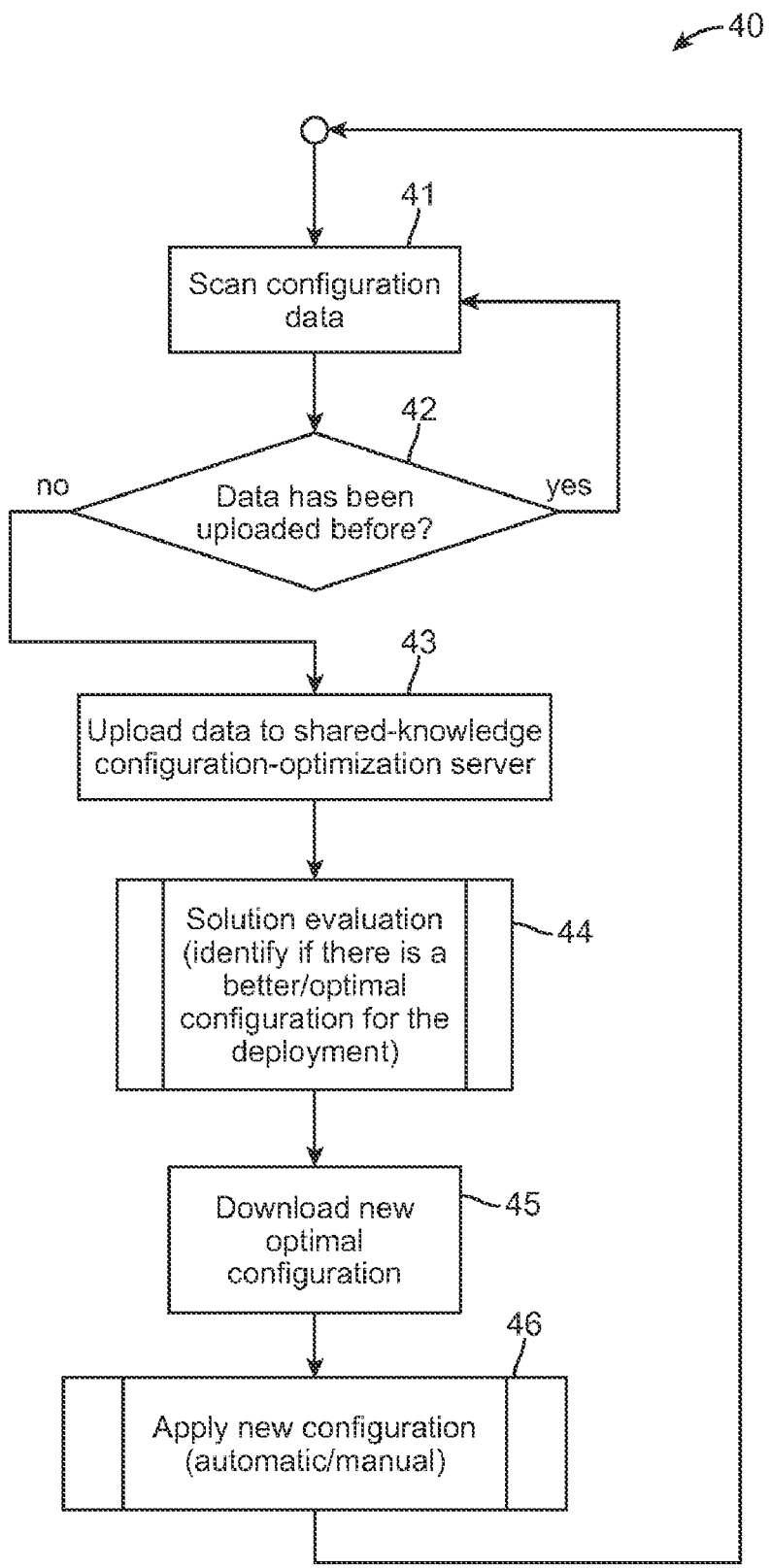
FIG. 5 shows a flowchart of a process for sharing performance data between different information technology product/solution deployments, according to an embodiment of the invention.

FIG. 5 shows a flowchart of a client process 40 for sharing performance data between different IT product/solution deployments, according to an embodiment of the invention. Process block 41 scans current configuration data at the client side for an IT product/solution deployment, including: a set of parameters to be analyzed, such as hardware data, software data (e.g., OS, middleware, product specific), deployment dimensions (e.g., number of clients to be supported by this deployment); a set of parameters to be optimized (e.g., a sub-set of the previous group of data) along with the desired optimization policy for each parameter. Process block 42 determines if such data has been uploaded to the server. If yes, the process proceeds back to block 41, else to block 43.

In process block 43, the client sends the scanned data to the server. For example, the scanned data can either be uploaded to the server periodically or when some of the parameter values change over/below predefined thresholds. In process block 44 on the server side, data from all the different clients for the IT product/solution are collected and for each deployment the optimal configuration is determined, as described further below in relation to FIG. 6. In process block 45 the optimal configuration information is downloaded to the respective requesting client. In process block 46 at the client side, the newly received configuration information is automatically/manually applied to the IT product/solution deployment. Specifically, the client may apply the optimal configuration based on policy settings such as: automatically (i.e., always applies the configuration changes pushed from the server); when under/over threshold (i.e., applies configuration changes to configuration parameters that are under/over a predefined threshold); manual intervention required (i.e., an operator must accept the changes or otherwise).

Figure 6:
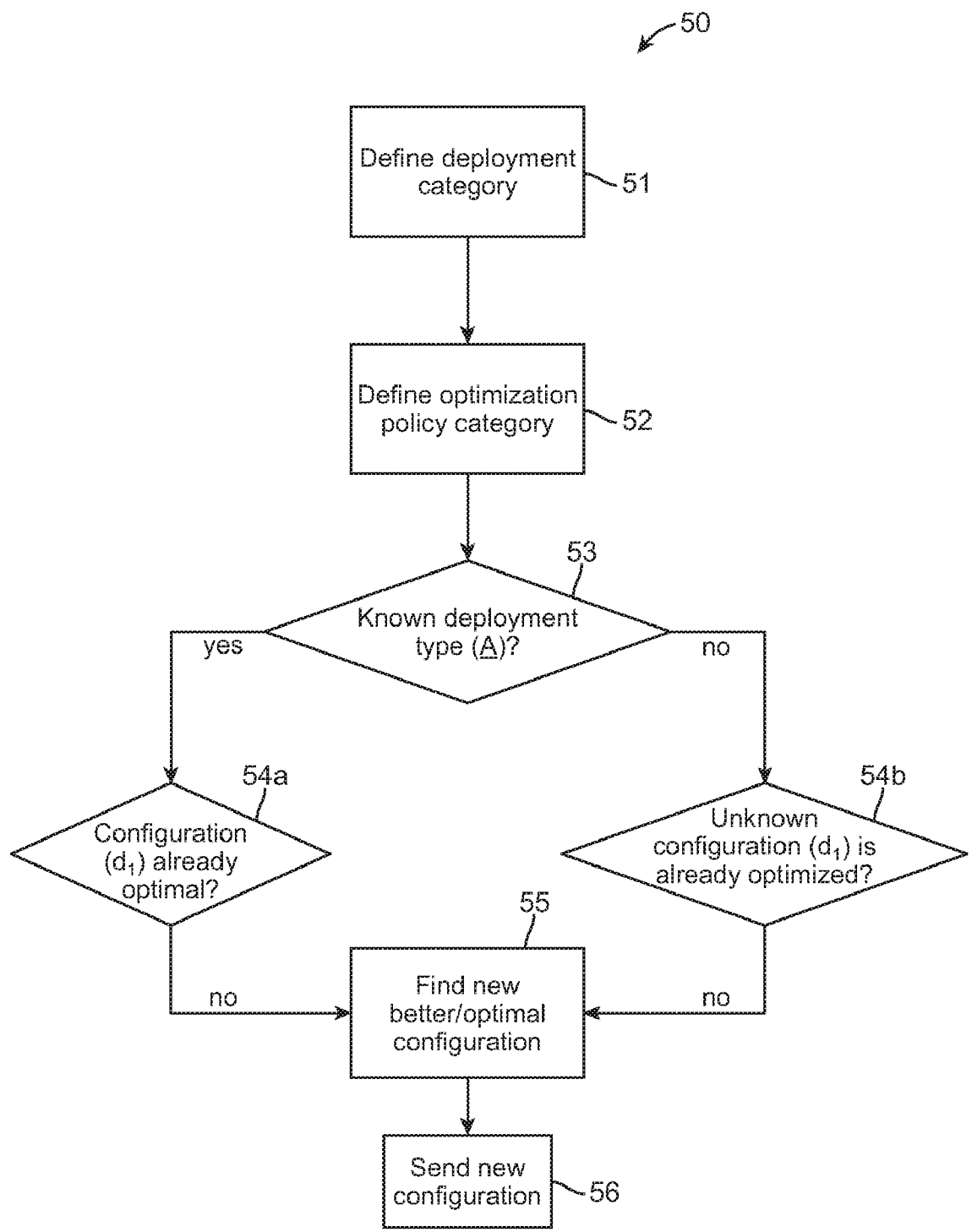
FIG. 6 shows a flowchart of a process for determining and sharing optimal configuration information between different information technology product/solution deployments, according to an embodiment of the invention.

FIG. 6 shows a flowchart of a server process 50 for determining optimal configuration of each deployment of an IT product/solution, according to an embodiment of the invention. The processing blocks are described below:

Block 51: Define deployment category. This process involves filtering performance model parameter data received from clients according to the deployment type. Each product performance model defines ranges for a subset of the parameters to be analyzed to define the category of each deployment, Block 52: Define optimization policy category. Once the deployment has been assigned to a category (e.g., SMB deployment, Enterprise Deployment, etc.), it is further filtered according to optimization policies specified by the customer of the deployment (e.g., two different policies for a Web application may be "maximize throughput" or "minimize response time").

Block 53: Determine if the deployment is a known deployment type ($\underline{A}$)? If yes, proceed to block 54a, else block 54b.

Block 54a: Determine if the unknown configuration ($d_i$) for the deployment is already optimal. If not, proceed to block 55, else stop.

Block 54b: Determine if a configuration ($d_i$) for the deployment is already optimal? If not, proceed to block 55, else stop.

Block 55: Find new better/optimal configuration for the deployment.

Block 56: Send new configuration to the client at the deployment.

As such, in blocks 54a and 54b, if an optimal configuration for that deployment environment already exists (e.g., because previously identified for the same customer or for a different one), no further processing occurs. In block 55, since an optimal solution for that environment does not exist, the solution engine 13 (FIG. 3) determines the optimal configuration by leveraging data from different deployments.

Figure 7:
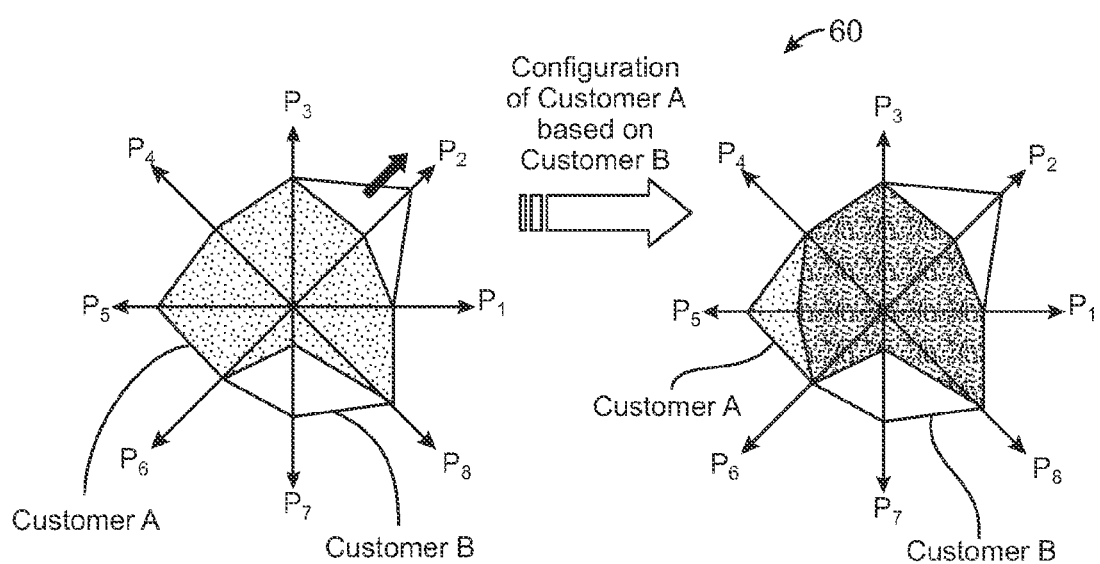
FIG. 7 shows a graphical example of sharing and applying optimal configuration information between different information technology product/solution deployments, according to an embodiment of the invention.

Referring to the example process 60 in FIG. 7, consider a deployment (Customer A) for an IT product/solution represented by a set of performance model parameters to be analyzed ($P_i$, i=1, ..., 8), and whose optimization policy can be expressed as a desired increment for the value of parameter $P_2$. Assuming that another customer (Customer B) whose deployment type and optimization policies are the same of Customer A, has already reached an optimal configuration for its deployment, then the solution engine 13 can compare the two sets of performance model parameters (i.e., performance model parameters of Customer A and Customer B) and find that varying two of them (e.g., $P_5$ and $P_7$) allows Customer A to reach the desired optimal configuration for its deployment, similar to the deployment at Customer B.

The following example provides a scenario describing the process of knowledge-sharing to handle a new sub-optimal IT product/solution configuration (corresponding to a new installation of an IT product/solution) and suggests a known "good" configuration for that deployment. It is assumed that the knowledge-sharing system manages all the configuration information related to products/solutions using XML files. A Sample Product devised to illustrate the scenario has a performance model defined by the following XML schema:

```
<?xml version="1.0" encoding="UTF-8"?>
<xsd:schema xmlns:xsd="http://www.w3.org/2001/XMLSchema"
    targetNamespace="http://www.example.org/PerfModelSchema"
    xmlns:tns="http://www.example.org/PerfModelSchema"
```

```
elementFormDefault="qualified">
<xsd:complexType name="PerfModel">
    <xsd:annotation>
        <xsd:documentation>
            Performance Model for product Sample Product
        </xsd:documentation>
    </xsd:annotation>
    <xsd:sequence>
        <xsd:element name="ProductDetails" type="tns:PD"
            minOccurs="1" maxOccurs="1" />
        <xsd:element name="HardwareConfiguration"
            type="tns:HC" minOccurs="1" maxOccurs="1" />
        <xsd:element name="OperatingSystemConfiguration"
            type="tns:OSC" minOccurs="1" maxOccurs="1" />
        <xsd:element name="ProductConfiguration" type="tns:PC"
            minOccurs="1" maxOccurs="1" />
        <xsd:element name="Metrics_and_optimization_policies"
            type="tns:MCS" minOccurs="1" maxOccurs="1" />
    </xsd:sequence>
</xsd:complexType>
<xsd:complexType name="PD">
    <xsd:annotation>
        <xsd:documentation>
            Description of product
        </xsd:documentation>
    </xsd:annotation>
    <xsd:sequence>
        <xsd:element name="prod_name" type="xsd:string" />
        <xsd:element name="prod_version" type="xsd:string" />
    </xsd:sequence>
</xsd:complexType>
<xsd:complexType name="HC">
    <xsd:annotation>
        <xsd:documentation>
            Hardware configuration
        </xsd:documentation>
    </xsd:annotation>
    <xsd:sequence>
        <xsd:element name="arch" type="xsd:string" />
        <xsd:element name="CPU_number"
            type="xsd:positiveInteger" />
        <xsd:element name="CPU_speed"
            type="xsd:positiveInteger" />
        <xsd:element name="Physical_memory"
            type="xsd:positiveInteger" />
        <xsd:element name="Storage_size"
            type="xsd:positiveInteger" />
        <xsd:element name="Storage_speed"
            type="xsd:positiveInteger" />
        <xsd:element name="Network_speed"
            type="xsd:positiveInteger" />
    </xsd:sequence>
</xsd:complexType>
<xsd:complexType name="OSC">
    <xsd:annotation>
        <xsd:documentation>
            Operating System configuration
        </xsd:documentation>
    </xsd:annotation>
    <xsd:sequence>
        <xsd:element name="OS_name" type="xsd:string" />
        <xsd:element name="OS_version" type="xsd:string" />
        <xsd:element name="Virtual_memory_size"
            type="xsd:positiveInteger" />
    </xsd:sequence>
</xsd:complexType>
<xsd:complexType name="PC">
    <xsd:annotation>
        <xsd:documentation>
            Product Specific configuration
        </xsd:documentation>
    </xsd:annotation>
    <xsd:sequence>
        <xsd:element name="Deployment_size"
            type="xsd:string" />
        <xsd:element name="Thread_pool_size"
            type="xsd:positiveInteger" />
        <xsd:element name="DB_connection_pool_size"
            type="xsd:positiveInteger" />
    </xsd:sequence>
</xsd:complexType>
<xsd:complexType name="MCS">
    <xsd:annotation>
        <xsd:documentation>
            Product Specific metrics
        </xsd:documentation>
    </xsd:annotation>
    <xsd:sequence>
        <xsd:element name="CPU_utilization"
            type="tns:mcs_opt_pol" />
        <xsd:element name="Memory_utilization"
            type="tns:mcs_opt_pol" />
        <xsd:element name="IO_utilization"
            type="tns:mcs_opt_pol" />
        <xsd:element name="Throughput"
            type="tns:mcs_opt_pol" />
        <xsd:element name="Response_time"
            type="tns:mcs_opt_pol" />
    </xsd:sequence>
</xsd:complexType>
<xsd:complexType name="mcs_opt_pol">
    <xsd:sequence>
        <xsd:element name="Metric_value"
            type="xsd:positiveInteger" />
        <xsd:element name="OptPol" type="tns:opt"/>
    </xsd:sequence>
</xsd:complexType>
<xsd:simpleType name="opt">
    <xsd:restriction base="xsd:string">
        <xsd:enumeration value="keep"></xsd:enumeration>
        <xsd:enumeration value="up"></xsd:enumeration>
        <xsd:enumeration value="down"></xsd:enumeration>
    </xsd:restriction>
</xsd:simpleType>
<xsd:element name="PerfModel" type="tns:PerfModel">
</xsd:element>
</xsd:schema>
```

The product performance model, defined during product development and testing phases, includes all the parameters (e.g., parameters for hardware, operating system and product configuration) that may affect its performance, along with the current values of the key/critical metrics (that describe how the product is currently performing on that system), and the desired variations of those values as specified by the customer (its performance objectives or optimization policies). For simplicity of explanation, the number and type of parameters and metrics is kept small. For example, the Sample Product has a single-server topology where the server module is the only module whose configuration affects the performances of the entire product. Other products and performance models may involve more information. Each installation/deployment of the Sample Product is represented by an instance (XML file) of that XML schema.

The Sample Product is deployed at four different customer sites (Customers A, B, C, D), wherein three of the customers (Customers A, C and D) have been running the product for some time and their configurations are already stored in a database on the server 12 of the knowledge-sharing system 10 (e.g., as per process 50 in FIG. 6). The configurations of said three customer deployments of the product are represented by the XML codes below.

Customer A represents a client 11 that deployed the Sample Product in an environment that the knowledge-sharing system 10 has categorized as "large" ("Enterprise" in the XML file). Its configuration is not yet "optimal" since the customer is still requesting some of the performance metrics to be varied "up" or "down". Customer A configuration:

```xml
<?xml version="1.0" encoding="UTF-8"?>
<tns:PerfModel  xmlns:tns="http://www.example.org/PerfModelSchema"
        xmlns:xsi="http://www.w3.org/2001/XMLSchema-
            instance"
        xsi:schemaLocation="http://www.example.org/
            PerfModelSchema PerfModelSchema.xsd ">
    <tns:ProductDetails>
        <tns:prod_name>SampleProduct</tns:prod_name>
        <tns:prod_version>1.0.0.0</tns:prod_version>
    </tns:ProductDetails>
    <!-- This product has a model with a single server -->
    <tns:HardwareConfiguration>
        <tns:arch>PPC</tns:arch>
        <tns:CPU_number>4</tns:CPU_number>
        <tns:CPU_speed>1200</tns:CPU_speed>
        <tns:Physical_memory>4096</tns:Physical_memory>
        <tns:Storage_size>360</tns:Storage_size>
        <!-- Storage speed has to be specified according to a
        predefined benchmark -->
        <tns:Storage_speed>7</tns:Storage_speed>
        <tns:Network_speed>100</tns:Network_speed>
    </tns:HardwareConfiguration>
    <tns:OperatingSystemConfiguration>
        <tns:OS_name>AIX</tns:OS_name>
        <tns:OS_version>5.3.0.5</tns:OS_version>
        <tns:Virtual_memory_size>4096</tns:Virtual_memory_size>
    </tns:OperatingSystemConfiguration>
    <tns:ProductConfiguration>
        <tns:Deployment_size>Enterprise</tns:Deployment_size>
        <tns:Thread_pool_size>10</tns:Thread_pool_size>
        <tns:DB_connection_pool_size>2</
        tns:DB_connection_pool_size>
    </tns:ProductConfiguration>
    <tns:Metrics_and_optimization_policies>
        <tns:CPU_utilization>
            <tns:Metric_value>40</tns:Metric_value>
            <tns:OptPol>keep</tns:OptPol>
        </tns:CPU_utilization>
        <tns:Memory_utilization>
            <tns:Metric_value>40</tns:Metric_value>
            <tns:OptPol>down</tns:OptPol>
        </tns:Memory_utilization>
        <!-- Average IO read/write bytes per second -->
        <tns:IO_utilization>
            <tns:Metric_value>50000</tns:Metric_value>
            <tns:OptPol>keep</tns:OptPol>
        </tns:IO_utilization>
        <!-- Number of transactions per second -->
        <tns:Throughput>
            <tns:Metric_value>10</tns:Metric_value>
            <tns:OptPol>up</tns:OptPol>
        </tns:Throughput>
        <tns:Response_time>
            <!-- Average transaction response time in milliseconds -->
            <tns:Metric_value>100</tns:Metric_value>
            <tns:OptPol>down</tns:OptPol>
        </tns:Response_time>
    </tns:Metrics_and_optimization_policies>
</tns:PerfModel>
```

Customer C represents a client that deployed the Sample Product in an environment that the knowledge-sharing system 10 has categorized as "small" ("SMB" in the XML file). As for Customer A, its performance objectives have not been achieved yet. Customer C configuration:

```xml
<?xml version="1.0" encoding="UTF-8"?>
<tns:PerfModel  xmlns:tns="http://www.example.org/PerfModelSchema"
        xmlns:xsi="http://www.w3.org/2001/XMLSchema-
            instance"
        xsi:schemaLocation="http://www.example.org/
            PerfModelSchema PerfModelSchema.xsd ">
    <tns:ProductDetails>
        <tns:prod_name>SampleProduct</tns:prod_name>
        <tns:prod_version>1.0.0.0</tns:prod_version>
    </tns:ProductDetails>
    <!-- This product has a model with a single server -->
    <tns:HardwareConfiguration>
        <tns:arch>x86</tns:arch>
        <tns:CPU_number>2</tns:CPU_number>
        <tns:CPU_speed>1200</tns:CPU_speed>
        <tns:Physical_memory>2048</tns:Physical_memory>
        <tns:Storage_size>240</tns:Storage_size>
        <!-- Storage speed has to be specified according to a
        predefined benchmark -->
        <tns:Storage_speed>7</tns:Storage_speed>
        <tns:Network_speed>100</tns:Network_speed>
    </tns:HardwareConfiguration>
    <tns:OperatingSystemConfiguration>
        <tns:OS_name>Windows</tns:OS_name>
        <tns:OS_version>5.2</tns:OS_version>
        <tns:Virtual_memory_size>2048</tns:Virtual_memory_size>
    </tns:OperatingSystemConfiguration>
    <tns:ProductConfiguration>
        <tns:Deployment_size>SMB</tns:Deployment_size>
        <tns:Thread_pool_size>10</tns:Thread_pool_size>
        <tns:DB_connection_pool_size>2</
        tns:DB_connection_pool_size>
    </tns:ProductConfiguration>
    <tns:Metrics_and_optimization_policies>
        <tns:CPU_utilization>
            <tns:Metric_value>25</tns:Metric_value>
            <tns:OptPol>keep</tns:OptPol>
        </tns:CPU_utilization>
        <tns:Memory_utilization>
            <tns:Metric_value>50</tns:Metric_value>
            <tns:OptPol>keep</tns:OptPol>
        </tns:Memory_utilization>
        <!-- Average IO read/write bytes per second -->
        <tns:IO_utilization>
            <tns:Metric_value>50000</tns:Metric_value>
            <tns:OptPol>keep</tns:OptPol>
        </tns:IO_utilization>
        <!-- Number of transactions per second -->
        <tns:Throughput>
            <tns:Metric_value>25</tns:Metric_value>
            <tns:OptPol>down</tns:OptPol>
        </tns:Throughput>
        <tns:Response_time>
            <!-- Average transaction response time in milliseconds -->
            <tns:Metric_value>50</tns:Metric_value>
            <tns:OptPol>up</tns:OptPol>
        </tns:Response_time>
    </tns:Metrics_and_optimization_policies>
</tns:PerfModel>
```

Customer D represents a client that deployed the Sample Product in an environment that the knowledge-sharing system 10 has categorized as "SMB", such as that of Customer C. Since Customer D is not specifying any variation for the product performance key metrics, its configuration is assumed to be "optimal". Customer D configuration:

```xml
<?xml version="1.0" encoding="UTF-8"?>
<tns:PerfModel  xmlns:tns="http://www.example.org/PerfModelSchema"
        xmlns:xsi="http://www.w3.org/2001/XMLSchema-
            instance"
        xsi:schemaLocation="http://www.example.org/
            PerfModelSchema PerfModelSchema.xsd ">
    <tns:ProductDetails>
        <tns:prod_name>SampleProduct</tns:prod_name>
        <tns:prod_version>1.0.0.0</tns:prod_version>
    </tns:ProductDetails>
    <!-- This product has a model with a single server -->
    <tns:HardwareConfiguration>
        <tns:arch>PPC</tns:arch>
        <tns:CPU_number>2</tns:CPU_number>
        <tns:CPU_speed>1200</tns:CPU_speed>
        <tns:Physical_memory>2048</tns:Physical_memory>
        <tns:Storage_size>240</tns:Storage_size>
```

```xml
<!-- Storage speed has to be specified according to a
predefined benchmark -->
<tns:Storage_speed>7</tns:Storage_speed>
<tns:Network_speed>100</tns:Network_speed>
</tns:HardwareConfiguration>
<tns:OperatingSystemConfiguration>
    <tns:OS_name>AIX</tns:OS_name>
    <tns:OS_version>5.3.0.5</tns:OS_version>
    <tns:Virtual_memory_size>2048</tns:Virtual_memory_size>
</tns:OperatingSystemConfiguration>
<tns:ProductConfiguration>
    <tns:Deployment_size>SMB</tns:Deployment_size>
    <tns:Thread_pool_size>10</tns:Thread_pool_size>
    <tns:DB_connection_pool_size>5</tns:DB_connection_pool_size>
</tns:ProductConfiguration>
<tns:Metrics_and_optimization_policies>
    <tns:CPU_utilization>
        <tns:Metric_value>75</tns:Metric_value>
        <tns:OptPol>keep</tns:OptPol>
    </tns:CPU_utilization>
    <tns:Memory_utilization>
        <tns:Metric_value>50</tns:Metric_value>
        <tns:OptPol>keep</tns:OptPol>
    </tns:Memory_utilization>
    <!-- Average IO read/write bytes per second -->
    <tns:IO_utilization>
        <tns:Metric_value>50000</tns:Metric_value>
        <tns:OptPol>keep</tns:OptPol>
    </tns:IO_utilization>
    <!-- Number of transactions per second -->
    <tns:Throughput>
        <tns:Metric_value>10</tns:Metric_value>
        <tns:OptPol>keep</tns:OptPol>
    </tns:Throughput>
    <tns:Response_time>
        <!-- Average transaction response time in milliseconds -->
        <tns:Metric_value>100</tns:Metric_value>
        <tns:OptPol>keep</tns:OptPol>
    </tns:Response_time>
</tns:Metrics_and_optimization_policies>
</tns:PerfModel>
```

The fourth customer (Customer B) has just deployed its instance of the Sample Product and its configuration is sent to the knowledge-sharing system 10 for the first time. Customer B configuration:

```xml
<?xml version="1.0" encoding="UTF-8"?>
<tns:PerfModel xmlns:tns="http://www.example.org/PerfModelSchema"
        xmlns:xsi="http://www.w3.org/2001/XMLSchema-instance"
        xsi:schemaLocation="http://www.example.org/
        PerfModelSchema PerfModelSchema.xsd ">
    <tns:ProductDetails>
        <tns:prod_name>SampleProduct</tns:prod_name>
        <tns:prod_version>1.0.0.0</tns:prod_version>
    </tns:ProductDetails>
    <!-- This product has a model with a single server -->
    <tns:HardwareConfiguration>
        <tns:arch>PPC</tns:arch>
        <tns:CPU_number>2</tns:CPU_number>
        <tns:CPU_speed>1200</tns:CPU_speed>
        <tns:Physical_memory>2048</tns:Physical_memory>
        <tns:Storage_size>240</tns:Storage_size>
        <!-- Storage speed has to be specified according to a
        predefined benchmark -->
        <tns:Storage_speed>7</tns:Storage_speed>
        <tns:Network_speed>100</tns:Network_speed>
    </tns:HardwareConfiguration>
    <tns:OperatingSystemConfiguration>
        <tns:OS_name>AIX</tns:OS_name>
        <tns:OS_version>5.3.0.5</tns:OS_version>
        <tns:Virtual_memory_size>2048</tns:Virtual_memory_size>
    </tns:OperatingSystemConfiguration>
    <tns:ProductConfiguration>
        <tns:Deployment_size>SMB</tns:Deployment_size>
        <tns:Thread_pool_size>20</tns:Thread_pool_size>
        <tns:DB_connection_pool_size>20</tns:DB_connection_pool_size>
    </tns:ProductConfiguration>
    <tns:Metrics_and_optimization_policies>
        <tns:CPU_utilization>
            <tns:Metric_value>95</tns:Metric_value>
            <tns:OptPol>down</tns:OptPol>
        </tns:CPU_utilization>
        <tns:Memory_utilization>
            <tns:Metric_value>50</tns:Metric_value>
            <tns:OptPol>keep</tns:OptPol>
        </tns:Memory_utilization>
        <!-- Average IO read/write bytes per second -->
        <tns:IO_utilization>
            <tns:Metric_value>50000</tns:Metric_value>
            <tns:OptPol>keep</tns:OptPol>
        </tns:IO_utilization>
        <!-- Number of transactions per second -->
        <tns:Throughput>
            <tns:Metric_value>4</tns:Metric_value>
            <tns:OptPol>up</tns:OptPol>
        </tns:Throughput>
        <tns:Response_time>
            <!-- Average transaction response time in milliseconds -->
            <tns:Metric_value>250</tns:Metric_value>
            <tns:OptPol>down</tns:OptPol>
        </tns:Response_time>
    </tns:Metrics_and_optimization_policies>
</tns:PerfModel>
```

The deployment type of Customer B is categorized by the system 10 as "SMB". Thus, when server 12 matches the configurations of the other customers, only Customer C and Customer D are considered for further comparison, while Customer A, whose deployment has been categorized as "Enterprise", is discarded from this optimization analysis.

When the knowledge-sharing system 10 proceeds to the next categorization step (i.e., involving the comparison of the customer optimization policies), then Customer C is found to have different optimization policies with respect to Customer B. Thus, Customer B data is not used for optimization in this case.

Instead, Customer D which has achieved its optimization policies, provides a set of current values for its metrics that are in the "direction" of the performance objectives specified by Customer B. For example, Customer D CPU utilization and response time are lower than that of Customer B which is just requesting a new configuration that could lower CPU utilization and response time values for Customer B. Moreover, Customer D has a greater value for throughput than that of Customer B, which is attempting to increase its throughput.

Thus, the knowledge-sharing system 10 (through operation of server 12) may determine that Customer D configuration can be proposed also to Customer B to allow Customer B to meet its performance objectives. By performing a comparison between the two configurations, it can be seen that the parameters values that are likely to cause the difference in product perfoiniance are the Thread Pool size and the DB Connection Pool size. A new configuration suggestion is sent to Customer B by the server, providing a variation of Thread Pool size and the DB Connection Pool size configuration parameters.

As such, according to embodiments of the knowledge-sharing system of the invention, the knowledge shared between clients is dynamically generated and fed to the server from multiple clients, wherein the effectiveness of the knowledge generated improves as the number of contributors (clients) increases. The knowledge-sharing system utilizes a knowledge base that includes a dynamic set of configurations to be shared with clients. The knowledge-sharing system allows the knowledge base to be dynamically updated and improved with the number of clients that use it (e.g., sharing configuration information for a generic application between different installations/deployments). The sharing mechanism allows the clients to have access to the configurations used by any other clients. Specifically, a client is "notified" of a new configuration suitable for its needs as soon as such configuration is made available by another client that has used it and has received some benefit from its usage (e.g., better performances in response time).

As is known to those skilled in the art, the aforementioned example embodiments described above, according to the present invention, can be implemented in many ways, such as program instructions for execution by a processor, as software modules, as computer program product on computer readable media, as logic circuits, as silicon wafers, as integrated circuits, as application specific integrated circuits, as firmware, etc. Though the present invention has been described with reference to certain versions thereof; however, other versions are possible. Therefore, the spirit and scope of the appended claims should not be limited to the description of the preferred versions contained herein.

The terms "computer program medium," "computer usable medium," and "computer readable medium", "computer program product," are used to generally refer to media such main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for dynamically sharing performance information among multiple computing nodes, comprising:
   dynamically obtaining performance information from deployments of an information technology (IT) product/solution at said computing nodes;
   transmitting the obtained performance information to a server over a communication network for storing the obtained performance information in a knowledge database; and
   at the server, dynamically determining new configuration information based on the information in the database, storing the new configuration in the database, and dynamically providing the new configuration information to said deployments by transmitting the new configuration information over the network, wherein:
   the performance information includes current configuration parameter information for hardware and software configurations at each deployment of the deployments based on configuration policies of the deployment, and
   determining new configuration information further comprises, for each deployment in the deployments, based on the information obtained from the deployment:
      assigning a deployment type to the deployment based on the obtained parameter information from the deployment, wherein the deployment type is a function of the characteristics of the computing environment of the deployment; and
      in response to an optimal configuration existing in the database for the deployment type, then providing the existing optimal configuration for the deployment type.

2. The method of claim 1, wherein the performance information at each deployment includes current configuration information at the deployment and determining new configuration information further includes determining new configuration information based on the configuration information in the database.

3. The method of claim 1, further including, for each deployment in the deployments:
   in response to an optimal configuration not existing in the database for the deployment type, then the method comprises:
   determining an optimal configuration for the deployment based on the configuration information in the database for the deployment type;
   storing the optimal configuration for the deployment in the database; and
   providing the optimal configuration for the deployment.

4. The method of claim 1, further including applying the new configuration information at a second deployment based on configuration policies at the second deployment.

5. The method of claim 1, further including a requesting deployment that requests new configuration information, such that providing new configuration information includes providing the new configuration information to the requesting deployment.

6. A system for dynamically sharing performance information among multiple computing nodes, comprising:
   one or more client modules, and a server module;
   each client module configured for operating at a deployment of an information technology (IT) product/solution at a computing node, each client module further configured for dynamically obtaining performance information from the corresponding deployment and transmitting the obtained performance information to a server over a communication network;
   the server module configured for storing the obtained performance information in a knowledge database, dynamically determining new configuration information based on the information in the database, and storing the new configuration in the database, and providing the new configuration information to each deployment client module by transmitting the new configuration information over the network, wherein:

the performance information includes current configuration parameter information for hardware and software configurations at each deployment of the deployments based on configuration policies of the deployment, the server module is further configured for determining optimal configuration information for a deployment in the deployments based on the information obtained from the deployment by:

assigning a deployment type to the deployment based on the obtained parameter information from the deployment, wherein the deployment type is a function of the characteristics of the computing environment of the deployment; and in response to an optimal configuration existing in the database for the deployment type, then providing the existing optimal configuration for the deployment type.

7. The system of claim 6, wherein the performance information at each deployment includes current configuration information at the deployment, and the server module is further configured for determining new configuration information based on the configuration information in the database.

8. The system of claim 6, wherein the server module is further configured for determining optimal configuration information for a deployment based on the information obtained from the deployment, including:

in response to an optimal configuration not existing in the database for the deployment type, then the server module:

determines an optimal configuration for the deployment based on the configuration information in the database for the deployment type;

stores the optimal configuration for the deployment in the database; and provides the optimal configuration for the deployment.

9. The system of claim 6, wherein each client is further configured for applying the new configuration information at a second deployment based on configuration policies at the second deployment.

10. The system of claim 6, wherein each client is further configured for requesting new configuration information, and the server module is further configured for providing the new configuration information to the requesting client.

11. A computer program product for dynamically sharing performance information among multiple computing nodes, comprising a computer usable storage device including a computer readable program, wherein the computer readable program, when executed on a computer, causes the computer to:

dynamically obtain performance information from deployments of an information technology (IT) product/solution at said computing nodes;

transmit the obtained performance information to a server over a communication network for storing the obtained performance information in a knowledge database; and dynamically determine new configuration information at the server based on the information in the database, store the new configuration in the database, and dynamically provide the new configuration information to said deployments by transmitting the new configuration information over the network, wherein:

the performance information includes current configuration parameter information for hardware and software configurations at each deployment of the deployments based on configuration policies of the deployment, and determining new configuration information further comprises, for each deployment in the deployments, based on the information obtained from the deployment:

assigning a deployment type to the deployment based on the obtained parameter information from the deployment, wherein the deployment type is a function of the characteristics of the computing environment of the deployment; and in response to an optimal configuration existing in the database for the deployment type, then providing the existing optimal configuration for the deployment type.

12. The computer program product of claim 11, wherein the performance information at each deployment includes current configuration information at the deployment and the instructions for determining new configuration information further include instructions for determining new configuration information based on the configuration information in the database.

13. The computer program product of claim 11, wherein the instructions for determining new configuration information for a deployment in the deployments further include instructions for:

based on the information obtained from the deployment:

in response to an optimal configuration not existing in the database for the deployment type, then:

determining an optimal configuration for the deployment based on the configuration information in the database for the deployment type;

storing the optimal configuration for the deployment in the database; and providing the optimal configuration for the deployment.

14. The computer program product of claim 13, further including instructions for the computer to apply the new configuration information at a second deployment based on configuration policies at the second deployment.

* * * * *